(12) United States Patent
Huang et al.

(10) Patent No.: US 10,474,684 B2
(45) Date of Patent: Nov. 12, 2019

(54) METHOD, COMPUTER PROGRAM, COMPUTER PROGRAM PRODUCT AND SYSTEM FOR HANDLING SENSOR DATA

(75) Inventors: Vincent Huang, Sollentuna (SE); Richard Carlsson, Stockholm (SE); Julien Forgeat, Beijing (CN); Qingyan Liu, Beijing (CN); Siyan Zhao, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 621 days.

(21) Appl. No.: 14/376,037

(22) PCT Filed: Feb. 8, 2012

(86) PCT No.: PCT/CN2012/070947
§ 371 (c)(1),
(2), (4) Date: Jul. 31, 2014

(87) PCT Pub. No.: WO2013/116993
PCT Pub. Date: Aug. 15, 2013

(65) Prior Publication Data
US 2015/0006548 A1 Jan. 1, 2015

(51) Int. Cl.
*G06F 16/2457* (2019.01)
*G06N 5/04* (2006.01)
*G06F 16/23* (2019.01)

(52) U.S. Cl.
CPC ........ *G06F 16/24578* (2019.01); *G06F 16/23* (2019.01); *G06N 5/04* (2013.01)

(58) Field of Classification Search
CPC .. G06F 11/3447; G06F 3/01; G06F 17/30011; G06F 3/016; G06F 17/30528; G06F 3/011; G06F 16/24578
See application file for complete search history.

(56) References Cited

U.S. PATENT DOCUMENTS

2003/0012547 A1  1/2003  Naruto et al.
2007/0136740 A1  6/2007  Lee et al.
(Continued)

FOREIGN PATENT DOCUMENTS

CN  101714161 A1  5/2010

OTHER PUBLICATIONS

International Search Report for PCT Application No. PCT/CN2012/070947 dated Nov. 15, 2012, 3 pages.
(Continued)

*Primary Examiner* — Mariela Reyes
*Assistant Examiner* — Courtney Harmon
(74) *Attorney, Agent, or Firm* — Patent Portfolio Builders, PLLC

(57) ABSTRACT

A sensor data system, method and computer program configured to handle sensor data are disclosed. The system includes a reception unit adapted to receive sensor data, a storing unit adapted to store at least some of the received sensor data in an observations database, a recording unit adapted to record usage of the sensor data, and a relevance determination unit adapted to determine the relevance of the sensor data based on the recorded usage. A decision unit is adapted to remove excess sensor data with determined relevance below a limit from the observations database, and to retain relevant sensor data with determined relevance above the limit in the sensor database. Sensor data in an observations database may thereby be limited to a desired size, by removal of excess sensor data from the database.

28 Claims, 5 Drawing Sheets

(56) References Cited

U.S. PATENT DOCUMENTS

| | | | |
|---|---|---|---|
| 2008/0154776 A1 | 6/2008 | Xia et al. | |
| 2009/0002148 A1* | 1/2009 | Horvitz | G06Q 10/047 340/514 |
| 2009/0164251 A1* | 6/2009 | Hayter | G06F 19/3456 705/3 |
| 2009/0192366 A1* | 7/2009 | Mensinger | A61B 5/0031 600/301 |
| 2010/0169343 A1* | 7/2010 | Kenedy | G06F 17/30867 707/758 |
| 2011/0210926 A1* | 9/2011 | Pasquero | G06F 3/016 345/173 |
| 2011/0231233 A1* | 9/2011 | Iannace | G06Q 30/02 705/14.13 |
| 2012/0197911 A1* | 8/2012 | Banka | G06F 17/30864 707/752 |
| 2013/0311488 A1* | 11/2013 | Erdogan | G06F 17/30353 707/752 |

OTHER PUBLICATIONS

Written Opinion of the International Searching Authority for PCT Application No. PCT/CN2012/070947 dated Nov. 15, 2012, 7 pages.

* cited by examiner

METHOD, COMPUTER PROGRAM, COMPUTER PROGRAM PRODUCT AND SYSTEM FOR HANDLING SENSOR DATA

CROSS-REFERENCE TO RELATED APPLICATION

This application is a 35 U.S.C. § 371 national stage application of PCT International Application No. PCT/CN2012/070947, filed on 8 Feb. 2012, the disclosure of which is incorporated by reference herein in its entirety. The above-referenced PCT International Application was published in the English language as International Publication No, WO 2013/116993 A1 on 15 Aug. 2013.

TECHNICAL FIELD

The disclosure relates to a system, a method, a computer program product and a computer program for handling sensor data, particularly excess sensor data.

BACKGROUND

The number of sensors is increasing. Sensors commonly used include sensors for temperature, humidity, oxygen level, pH, depth, wind, rain, speed, acceleration, movement and so forth. Commonly a sensed value, of an observation, is used as a basis for some kind of action, or saved for later purposes. Hereinafter the term "observation" is used for a registered measurement sensed by a sensor without limitation to the described examples. The sensors may be used in a large spectrum of appliances: indoor, outdoor, various industrial appliances, vehicle mounted, to mention a few examples.

The environments monitored by sensors in this way may include any indoor or outdoor locations of any size, such as rooms requiring controlled conditions and more open spaces and locations of interest. Sensors may also monitor "objects" such as machines and humans, or the environment around or inside the objects. A few examples, out of a vast number of examples of the monitoring of objects are monitoring of the functioning of a human heart via a pacemaker, the environmental conditions in a vehicle cab or vehicle engine and the battery status of a battery in a mobile phone or vehicle.

Sensor data may also be used for controlling a process, typically an automated process where sensor data is via a system influencing an actuator, depending on the sensor observation. Observations are further collected for future need or for future potential need. Collected observations may be used for analysis, prognosis, diagnosis, statistics or research. This drives a desire to collect observations.

A sensor itself typically has limited resources for computing and data storage. With today's kind of sensors it is not feasible that each sensor should store any significant amount of observations. For a sensor located at a point of interest, it is neither desired to have a large amount of requests from data users, to arrive at a single sensor. In the following, "data user" is used as a representative term for users of observations/sensor data. A data user may be an application or a device. A data user may also be e.g. a system for creation of weather prognosis, or a system in a factory that controls a production process. These are just examples, but the description is not limited to these examples. Therefore multiple sensors typically may be connected into networks, referred to as sensor networks. Via a sensor network observations are often collected by a centralized computing and storage facility, typically a data server. This is simply to avoid the need for sensors to store all observations themselves, potentially receive large amounts of requests from data users, and to more easily utilize the collected observations. Such sensor networks may therefore become quite large and complex, e.g. including several different types of sensors installed at different locations, as well as communication links, gateways and servers for collecting and conveying observation results from the sensors to appropriate receiving parties.

Today there is an exponential growth of the usage of such sensor networks. With the increase of sensor networks and increase of observations availability for users, the requirement on data management and processing capability increases. It is already today a growth of observations data, data collected from sensors, and with the increased number of network-connected sensors, there may also be an exponential growth of data in the future. There are today solutions for limiting observations stored in databases. These solutions propose to detect duplicate data, and remove the duplicates, or over time remove old and expired data.

A problem with the above mentioned proposals to restrict the quantity of data or restrict the growth of data, is that there is a risk of either to keep too much data, or to remove too much data. The problem with today's solutions is how to remove unnecessary data without wasting useful data. Removal of data is necessary to avoid databases which otherwise virtually have to grow to an infinite size. It also necessary to keep data within a manageable size in order to meet data users' requirements on observations availability. Too large quantities of data will prevent data users to find a desired observation, or will require unnecessary resources to find relevant observations. However removing too much of the data, might decrease the usefulness of the sensors for data users. A question is to decide which sensor data to maintain and which data to remove from a database. A problem related to this question is how to technically implement a way of decreasing and/or automate the handling of sensor data in a computerized system.

SUMMARY

It is an object of the invention to address how to handle sensor data, and how to handle excess sensor data in a computerized system. It is possible to achieve this object and others by using a method, computer program, computer program product and a system as defined in the attached independent claims.

According to an aspect, a sensor data system configured to handle sensor data is provided. The system comprises a reception unit adapted to receive sensor data. The system further comprises a storing unit adapted to store at least some of the received sensor data in an observations database. The system further comprises a recording unit adapted to record usage of the sensor data, and a relevance determination unit adapted to determine the relevance of the sensor data based on the recorded usage. The system further comprises a decision unit adapted to remove excess sensor data with determined relevance below a limit from the observations database, and to retain relevant sensor data with determined relevance above the limit in the sensor database. Hereby is achieved that the system is able to, based on recorded usage of sensor data, select irrelevant or relatively unimportant sensor data and discard such data while also deciding to keep relatively important sensor data.

In an embodiment of the system, the relevance calculation unit comprises a uniqueness calculation unit for calculation of the uniqueness of the sensor data. In another embodiment of the system, the relevance calculation unit comprises a usage calculation unit for calculation of the usage of the sensor data. In anther embodiment of the system, the relevance calculation unit comprises an influence calculation unit for calculation of the influence of the sensor data. In another embodiment of the system, the relevance calculation unit is adapted to determine the age of the sensor data by an age determination unit. In another embodiment of the system, the relevance calculation unit is further adapted to determine the relevance of the sensor data based on parameters comprising a combination of at least two of: uniqueness, usage, influence, and age of the sensor data. In another embodiment of the system, the retained sensor data is used for reporting observations, or sensor data is made available to a data user. In another embodiment of the system, the relevance calculation unit is further adapted to perform determination periodically, or when an observations database exceeds a certain size. In another embodiment of the system, the parameters for determination are static set, or dynamically adapted by the system.

According to another aspect, a method in a sensor data system for handling sensor data is provided. The method comprises receiving sensor data. The method further comprises storing at least some of the sensor data in an observations database. The method further comprises recording the usage of the received sensor data, and determining the relevance of the received sensor data based on the recorded usage. The method further comprises deciding of removal of excess sensor data with determined relevance below a limit, and retention of sensor data with relevance above the limit in an observations database.

In an embodiment of the method, the relevance of the sensor data is calculated by calculation of the uniqueness. In another embodiment of the method, the relevance of the sensor data is calculated by calculation of the usage. In another embodiment of the method, the relevance of the sensor data is calculated by calculation of the influence. In another embodiment of the method, the relevance of the sensor data is determined by determination of the age. In another embodiment of the method, the relevance of the sensor data is determined by a combination of at least two of: uniqueness, usage, influence, and age of the sensor data. In another embodiment of the method, the retained sensor data is used for reporting observations, or sensor data is made available to a data user. In another embodiment of the method, relevance determination is performed periodically, or when an observations database exceeds a certain size. In another embodiment of the method, the parameters for determination are static set, or dynamically adapted.

According to another aspect, a computer program, comprising computer readable code means is provided. The computer program comprises computer readable code means which when run by sensor data system causes sensor data system to perform receiving of sensor data. The computer program further comprises storing at least some of the sensor data in an observations database. The computer program further comprises recording the usage of the received sensor data, and determining the relevance of the received sensor data based on the recoded usage. The computer program further comprises deciding of removal of excess sensor data with determined relevance below a limit, and retention of sensor data with relevance above the limit in an observations database.

In an embodiment of the computer program, the relevance of the sensor data is calculated by calculation of the uniqueness. In another embodiment of the computer program, the relevance of the sensor data is calculated by calculation of the usage. In another embodiment of the computer program, the relevance of the sensor data is calculated by calculation of the influence. In another embodiment of the computer program, the relevance of the sensor data is determined by determination of the age. In another embodiment of the computer program, the relevance of the sensor data is determined by a combination of any of: uniqueness, usage, influence, or age of the sensor data. In another embodiment of the computer program, the retained sensor data is used for reporting observations, or sensor data is made available to a data user. In another embodiment of the computer program, relevance determination is performed periodically, or when an observations database (170) exceeds a certain size. In another embodiment of the computer program, the parameters for determination are static set, or dynamically adapted. In another embodiment of the computer program, a computer readable medium and a computer program is the computer program stored on the computer readable medium.

The above method and system and computer program may be configured and implemented according to different optional embodiments. Possible embodiments may comprise a uniqueness calculation unit for calculation of the uniqueness of the sensor data, or a usage calculation unit for calculation of the usage of the sensor data, or an influence calculation unit for calculation of the influence of the sensor data. Further embodiments may be determination of the age of the sensor data by an age determination unit. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
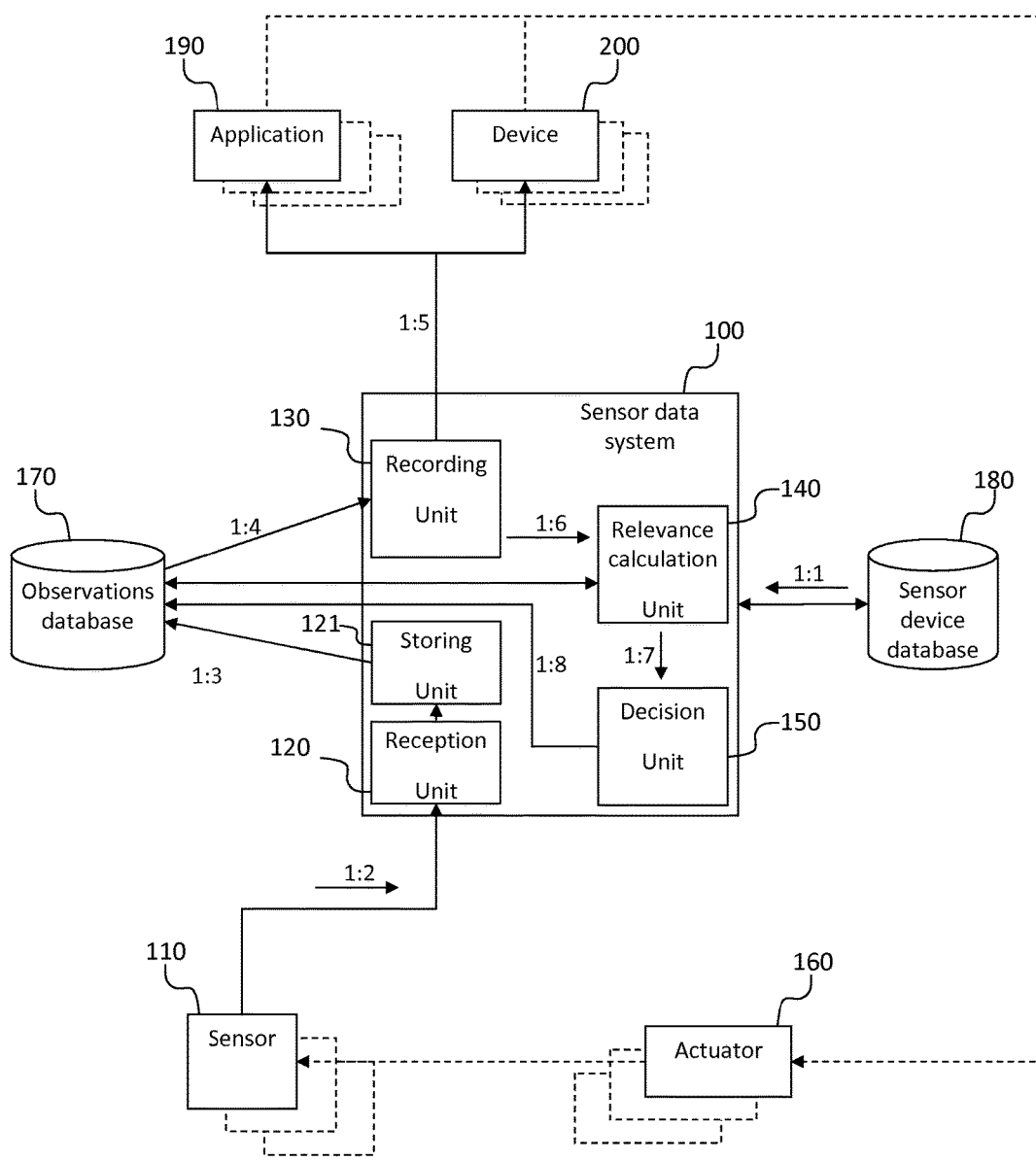
FIG. 1 is an overview of a sensor data system.

Briefly described, a solution is provided in a sensor data system for removal of excess sensor data. The intention with the system is to limit sensor data, i.e. observations, stored in a database to chiefly include observations relevant to data users, and accordingly remove unnecessary observations from the database. The term sensor data comprises a reading from a sensor, i.e. a value. By example sensor data may include a simple digital reading stating a "0" or a "1", or a sensor data may range all the way to an extensive message including the value and related meta data such as time of reading, sensor id, and location. These examples are not limiting the term sensor data to other related meanings of sensor data. When observations are received by a sensor data system, observations that are already determined by the system as irrelevant, such observations may be filtered away and discarded. Observations are further used by data users, either upon request, or by publishing, and data users use the observations in a desired way. It may be for influencing an actuator, used in another system, or for information purposes. By recording of data user's usage of observations, the system may determine which specific observations are relevant to data users, and which observations are not used. A relevance calculations unit in the system calculates which observations that may be potentially more relevant and which observations that may be potentially less relevant, to store for future use.

At a later step it is decided, by a decision unit, which observations are considered as excess data and consequently should be removed. The decision unit may additionally instruct an observations database, to remove excess observations.

Subsequently observations are received by the sensor data system, whereof some observations may be filtered away immediately at reception, and observations that remains, are stored in an observations database. Data users will use the observations and the sensor data system will iteratively remove excess data deemed less relevant from the observations database and thereby be able to limit the size of the observations database.

An example of how the sensor data system may be arranged will now be described with reference to FIG. 1. According to the figure, a sensor data system 100 is arranged to receive observations from a sensor 110, and store observations in an observations database 170. Information about the sensor 110 is maintained in a sensor device database 180. An application 190 or a device 200 receive an observation, and may use the observation to influence an actuator 160. An application 190 may be e.g. a computer program run by a personal computer, a computer program run by a mobile handset, or a computer program run by a server.

As shown in FIG. 1 information about sensors 110 is maintained in the sensor device database 180. When it is desired to add observations from a new sensor, information about the new sensor 110 is added to the sensor device database 180. Such information may include: type of sensor, location (e.g. geographical coordinates), types of output data and possible input data, manufacturer, version, id/serial number, installation time, hardware and software version, to give some examples. The sensor data system 100 will accordingly be aware (1:1) of the new sensor 110 information added to the sensor device database 180. Such awareness may be accomplished when the sensor data system 100 periodically requests the sensor device database 180 for any changes of the sensors 110, or when the sensor device database 180 may update the sensor data system 100 at changes of the database. A sensor database 180 may be a raw text file in a small scale implementation, it may be an SQL database, or it may be key-value pair database in a large scale implementation, not limiting other choices of databases.

When a sensor 110 is deployed, observations will be received by the sensor data system 100 from the sensor 110. According to the figure, a reception unit 120 receives observations (1:2), and may optionally at reception filter away some observations determined to be non-relevant or of less importance, e.g. according to predetermined rules such as a time rule which states that an observation from a certain sensor does not have to be stored if it is received within a certain time interval after the latest stored observation from that sensor. Another filtering rule is that observations received from a certain sensor simply is disregarded completely, due to a set indication indicating that the sensor is faulty, is not anymore authorized to store data in the observations database 170 or have not been used by any data user for a certain time, for instance one year. The reception unit 120 may also be configured to include functionality in addition to the receiving and filtering, such as observing, logging and supervising of observations, as well as other ways of surveillance of data or creation of metadata related to observations. The action receive may include inspection of all data, by example through meta information as identity of sensor, location of sensor, time of observation, as well as other types of information related to an observation. Observations determined to be relevant by the reception unit 120 are stored (1:3) in the observations database 170 by a storing unit 121. The storing unit 121 may parse data to a data structure and format suitable for an observations database 170. In an embodiment observations may be received in various formats. Unifying the various formats may be handled by the reception unit 120. In a further embodiment different observations databases 170 may be structured differently or require different data formats. The storing unit 121 may handle various formats and structures required by different observations databases 170. Usage of observations (1:4) is recorded by a recording unit 130. The recording unit 130 may log which individual observations are used and which are not, and the frequency of usage. Observations are provided (1:5) to a data user. Examples of observations data formats may be plain text (e.g. txt files), XML (eXtensible Markup Language), or JSON (JavaScript Object Notation), not limiting other formats to be used. Communication of observations may be performed over simple e-mail, http (Hypertext Transfer protocol), https (http secure), ftp (file transfer protocol), SIP (Session Initiation Protocol) or other suitable protocols for data transfer. Observations may be provided by publications of observations, where the observations database 170 publishes certain observations to certain data users. Observations may as well be provided to data users when a data user sends a request to the observations database 170 referring to a specific observation or a set of observations or to a specific sensor, etc. These should be seen as examples, not limiting the scope of the described solution and other ways of provision of observations are possible, which is rather related to practical implementation.

An example of observation usage for an application 190 or a device 200, may be to influence an actuator 160. The actuator 160 may be exemplified by a heater and the sensor 110 may be exemplified by a temperature sensor, and an application 190 may determine an environmental temperature to be too low, and set the heater to on. A subsequent observation received by the application 190 may indicate a satisfactory temperature, and accordingly the application will set the heater to off.

When a usage of an observation has been detected by the recording unit 130 the usage forms basic data for a relevance calculation unit 140, according to FIG. 1. The relevance calculation unit 140 uses the observation usage as an input (1:6) for calculation of a relevance of a particular observation. The calculated relevance result (1:7) forms a basis for a decision unit 150, to decide whether an observation is relevant, or not relevant. A consequence of a non relevance decision related to an observation, may be removal of the observation from the observations database 170.

Figure 2:
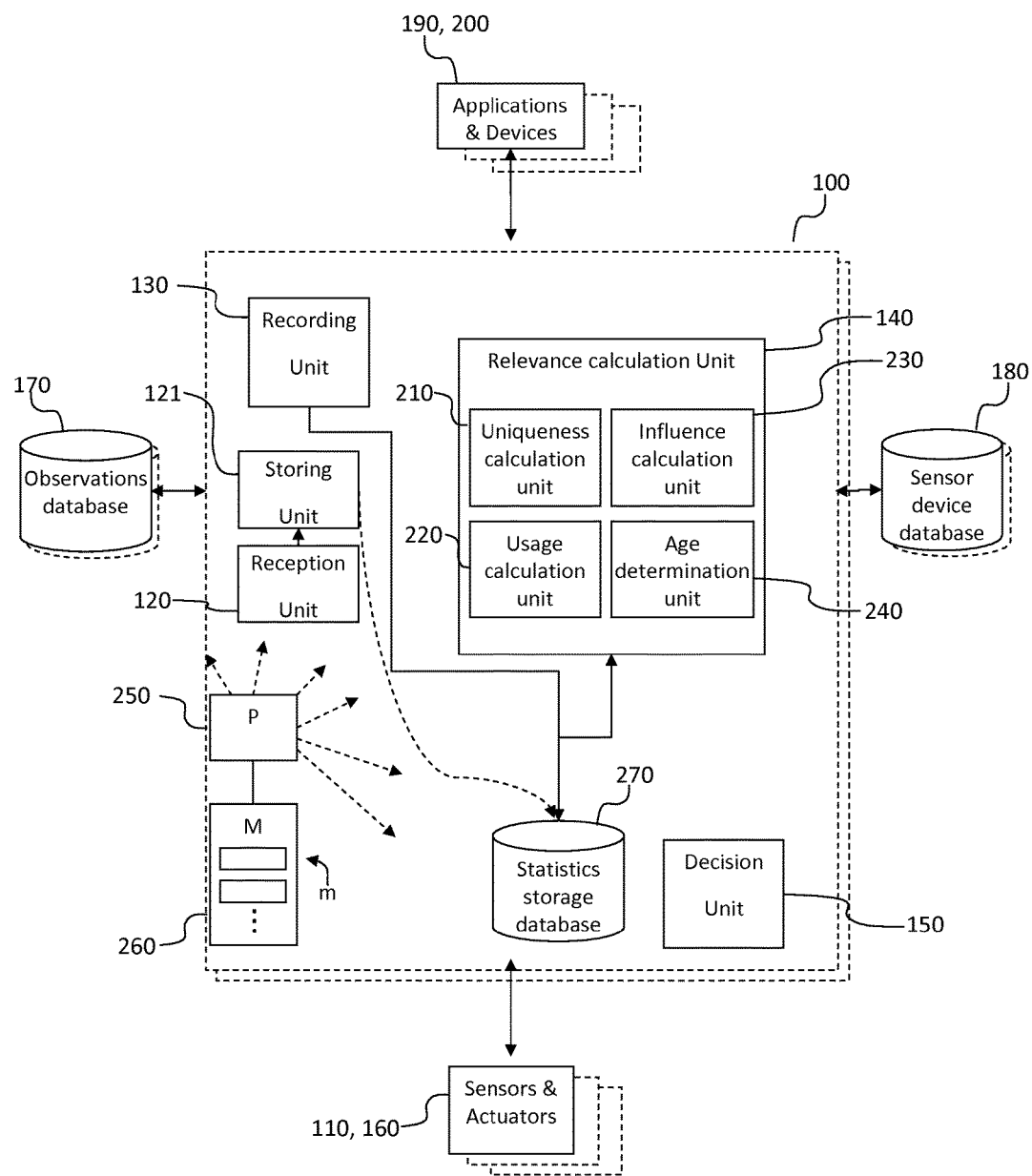
FIG. 2 shows a sensor data system with various calculation units.

FIG. 2 shows an embodiment of a sensor data system 100 in more detail. References shown in FIG. 1 correspond to references shown in FIG. 2. As shown in the figure, the relevance calculation unit 140 comprises a uniqueness calculation unit 210 for calculation of uniqueness of observations. The relevance calculation unit 140 further comprises a usage calculation unit 220 for calculation of observations usage. The relevance calculation unit 140 further comprises an influence calculation unit 230 for calculations of observations influence. The relevance calculation unit 140 further comprises an age determination unit 240 for determination of an age of observations. The sensor data system 100 comprises a processing unit "P" 250 with a memory unit "M" 260 for execution and storage of program code for operation of the sensor data system 100.

According different possible embodiments, the relevance calculation unit 140, shown in FIG. 2, may comprise at least one of: the uniqueness calculation unit 210, the usage calculation unit 220, the influence calculation unit 230, and the age determination unit 240. The uniqueness calculation unit 210 may calculate the uniqueness of observations. An observation may be important or potentially present a significant influence. But if by example a number of observations are being equal or similar in a line, the observations equal or similar may be considered not unique and therefore subject for non-relevance consideration.

There are many different ways to find redundant data, such as clustering algorithms. In an embodiment semantic tagged data may be considered, i.e. sensor readings with meta-data. The meta-data may include attribute information such as source of the reading, sampling time, sampling location, measurement property (temperature, humidity), etc. The similarity of the data can be calculated as weighted distance of these attributes. The weights of the attributes may not be constant either. By example, the weight for the time attribute may decrease with age, which means more redundant data may be considered non-relevant when it ages. This will be further described below. Relevance of an observation may be expressed as the following: $r=g(d_n, n)f(a_n, o_n)$. The first part may represent the uniqueness of the data; it is a function of distance to other measurements and number of similar measurements. The second part may represent the usefulness of the data; it is a function of how many actions are triggered by the measurement. Examples of these functions are described in the following sections. Relevance "r" may be calculated according to; $r=g(d_c/n_c)$, where $d_c$ is the cluster size and $n_c$ is the number of samples in the cluster and "g" is the function of $d_c$ and $n_c$. "g" may depend on observations characteristics and rating objectives. Examples of such functions are monotonic increasing functions, such as Sigmoid function, Hyperbolic function, or Polynomial functions.

Further according to the FIG. 2. The usage calculation unit 220 may receive log information from the recording unit 130 about how observations have been used by data users. In some cases observations are used to monitor certain conditions in order to take appropriate actions based on the information provided from sensors, such actions may include activation of some type of actuator(s). By example:

Turn on a ventilation system when the temperature in a room exceeds a certain limit.

Activate an alarm when movement is detected by a motion detection sensor.

Open an oxygen release valve to add oxygen to an aquarium when oxygen levels have been detected to be too low.

Some arrangements may be controlling a large number of actuators using a large number of different sensor observations as input. According to an embodiment a procedure of measuring sensor information relevance is to use information about which sensors have triggered the highest number of actuators to be activated. Sensors that have provided data upon which many actuators have been activated may be considered to be more relevant. Observations from a relevant sensor may then be considered relevant as well. An example; each time an observation from a sensor is used to trigger an action by an actuator, the system increases the relevance value of that particular sensor. The calculation procedure to compare the relevance between different sensors may depend on what is suitable for the particular application or device which uses the observations.

FIG. 2 shows a statistics storage database 270, which in an embodiment receives statistical data from the storage unit 121 and recording unit 130. According to an embodiment, the received data is in XML-format and further parsed to e.g. sensor id, observation id, sampling time, sensor location, usage time, data user id, data user type, not limiting other formats. The parsed data is further stored in the statistics storage database 270. The data in the statistics storage database 270 may be used by the relevance calculation unit 140, for calculation of relevance.

A way of calculating relevance is to use the formula: $r_n=f(a_n/o_n)$, where $r_n$ is the relevance value of sensor n given by the function f of $a_n$, which is the number of actions made based on the observations made by sensor n, and the $o_n$, which is the number of observations made by sensor n. "f" may depend on observations characteristics and rating objectives. Examples of such functions are monotonic increasing functions, such as Sigmoid function, Hyperbolic function, or Polynomial functions.

Another way of calculating relevance is to use the formula: $r_n=f(a_n/a_{tot})$, where $r_n$ is the relevance value of sensor n given by the function of $a_n$, the number of actions made based the observations made by sensor n and $a_{tot}$, the total number of actions recorded for all sensors in a collection of sensors.

FIG. 2 is further shows the influence calculation unit 230. In an embodiment observations are used for informational purposes. By example a data user may be a client application in a mobile phone of a person with a desire to know the temperature at a specific location, actual temperature, or a historical temperature. Another example may be where observations are used for statistical analysis or historical reporting. Yet another example is where observations are used for influence of an actuator by an application or a device. A variant of this example is where a number of observations from a number of sensors are used to influence at least one actuator, by trigger the actuator to perform its action. Still another example is where the sensor data system is comprised in or connected to a vehicle, such as a car, airplane, train, truck and bus, and the sensors are comprised in the vehicle and wherein the data user is a vehicle-internal diagnostics system. The sensor data system could even be a part of the vehicle-internal diagnostics system, which for example is used for diagnosing vehicle systems such as a combustion engine system and a brake system and storing fault codes and initiating visual, tactile and/or audio warnings to the driver.

When several sensors are used to trigger an actuator, it may be useful to measure which sensor has the highest influence on the triggered action. In this example, a trigger to influence is a function of all the sensor values: $t=f(v_1, v_2, \ldots, v_n)$ The relevance of each sensor used in the trigger function is the difference between t and the same trigger function calculated without using the value of the given sensor: $r_n=t-t_n$ Depending on the nature of the trigger function t, $t_n$ can be calculated by removing $v_n$ or replacing $v_n$ with a neutral value that can for example be an average of the formers measures.

Further, FIG. 2 shows the age determination unit 240. In an embodiment the age determination unit 240 determines the relevance of observations depending on the age of the observations. Determination of relevance of observations that depends on age, may be performed in different ways. An example is observations received from a sensor which are stored, e.g. in an observations database 170, in time order, and when an observation has reached a predetermined age, the observation is considered not relevant. Another example is observations stored, e.g. in an observations database 170, in time order. When the database has reached a predetermined size, the oldest observation is considered not relevant. Yet another example is where observations are received from sensors and where a database, e.g. an observations database 170, performs a round robin procedure to determine relevance of observations depending on age. An example of such a set-up may be as follows:

A number of gauge tables may be created as follows:
A first table may be for storage of monthly data, which could be set to never expire.
A second table may be for storage of weekly data, which could be set to never expire.
A third table may be for storage of daily data, which could be set to expire after five years, by example.
A fourth table may be for storage of hourly data, which could be set to expire after one year, by example.
A fifth table may be for storage of half-hourly data, which could be set to expire after one year, by example.
A sixth table may be for storage of real-time data, which could be set to expire after half a year, by example.

When a new observation is received, it is firstly saved in the sixth table. If the timestamp of the new observation happens to be half an hour, it is saved to the fifth table too. If the timestamp happens to be an hour, it is saved to the fourth table too. And so on. When the data reaches the expiration time specified for each table, the data may be considered as non-relevant, according to the age determination unit 240, and may accordingly be subject for removal. It should be understood that the granularity of stored data and expiry times may be implementation related and that both the gauge table and the expiration times can be adjusted according to the real requirements. The above is just an illustrative example.

In another possible embodiment, the results from all four of the above described units: uniqueness calculation unit 210, usage calculation unit 220, influence calculation unit 230 and age determination unit 240, are combined together. A total relevance of each sensor data reading may be a combination of the relevance calculated in above described units. There are many ways to calculate a combined relevance. An example is linear combination: $r_{total} = \theta^T x$. Where $r_{total}$ is the total combined relevance. $\theta^T = [\theta_1 \; \theta_2 \; \ldots \; \theta_n]$ are the weighting parameters and $x^T = [P_1(r_1) \; P_2(r_2) \; \ldots \; P_n(r_n)]$ are the relevance calculated for each criteria. P is polynomial function, $P(v) = a_0 + a_1 x + a_2 x^2 + \ldots + a_k x^k$ where k can be different for different relevance features.

The parameters $\theta$ and a may be set manually by a system operator. Another example of setting the parameters $\theta$ and a is to use machine learning techniques to learn the parameters by first deciding the relevance for some training sensor observations and then let the system learn and adopt the parameters.

In an embodiment it may only be of interest to calculate the relevance of data which may be considered relevant or non relevant, an example is to apply the sigmoid function $g(z) = 1/(1+e^{-z})$ to the total relevance to get $g(r_{total})$ and use a logistic regression to learn the parameters by first deciding manually which data that may be considered non relevant from the training observation data set.

FIG. 2 further shows the decision unit 150. According to an embodiment, the decision unit 150 receives a result from the relevance calculation unit 140 about the calculated relevance related to an observation. The decision unit 150 decides if an observation should be retained in a database or removed from a database, by example an observations database 170. As a result of a removal decision, the decision unit 150 may send appropriate instructions to, by example, the observations database 170 to remove or delete the particular observation. It should be understood that the above described procedure may be applied to single observations, or applied to batches of observations.

In an embodiment, not shown in a figure, a calculated relevance, as an example by the relevance calculation unit 140, is associated with a monetary value. i.e. a relevance considered as high would represent a high monetary value, and a relevance considered as low would represent a low monetary value. Relevance calculation performed by the system may serve as a value estimation of observations. By association of a monetary value to relevance, that may enable a market place for brokerage of observations. Owners of sensors may sell their data to data users, potentially via intermediates.

A few examples are in the following provided of how or where a sensor data system 100 may be used. These examples are not limiting to other applications or areas. An example of such an application area is utility, where it is typical to provide fresh water, receive waste water, generate and provide electricity as well as potentially receive locally generated renewable electricity, and so on. As an example a number of sensors may typically be used in such utility applications: water meter, gas meter, electricity meter, current sensor, voltage sensor, water pressure sensor, gas pressure sensor, water leak sensor, gas leak sensor. This is however not limiting other sensors to be used as well.

Another area which may serve as an example is transportation and logistics. In this area it may be desired to keep track of vehicles, goods carried by vehicles, monitor traffic situations such as on the water, in the air, on roads and railways. A number of different kind of sensors may be generating data, and a few examples are: vehicle speed sensor, position sensors and navigation systems (utilizing satellite based positioning systems like Global Positioning System, Galileo, Glonass and Beidou, and/or other positioning systems like dead-reckoning and mobile positioning using radio base stations), camera, motion sensor, altitude sensor, barcode reader, RFID reader and Near Field Communications reader/tag.

Yet another application area that exemplifies different kind of sensors is consumer electronics, both integrated in consumer electronics, as well as for control and/or management of electronics. Examples of such sensors are: accelerometer, gyroscope, shock sensor, switch sensor, energy consumption sensor, camera, altitude sensor, RFID reader and Near Field Communications reader.

Yet another area to exemplify application of a sensor data system 100 is agriculture and that may include agriculture in abroad term, both on land (farming and forestry) as well as in water such as fish farms. Examples of sensors are: water temperature sensor, water pH sensor, water oxygen level sensor, light sensor.

Another application area is meteorology, which is dependent on observations from different sensors, and where there may be a dependency between observations and the quality of weather prognosis. A few examples of sensors used in meteorology are: temperature, humidity, air pressure sensors, wind speed sensors, precipitation level sensors, frost sensor, and wave sensor.

Yet another area to exemplify application of a sensor data system 100 is vehicles. Whereas vehicles in the broad sense may be cars, trucks, busses, trains, as well as boats, yachts, ships, and aircrafts. It should be understood that vehicles in broad view may include a broad range of different sensors, but some examples are: accelerometer, gyroscope (used for yaw rate and linear and lateral acceleration) temperature sensors (intake air, inside air, and fuel), position sensor (including but not limited to GPS and enhanced GPS positioning techniques), vehicle height sensor (i.e. the sensor which measure the distance between the road and the chassis), steering wheel sensor (such sensor is used not only to steer the vehicle, but also to check whether the driver might be asleep). Further: pressure sensor or seat belt sensor (used e.g. for checking the number of passengers in a vehicle), weight sensor (to measure the weight of the vehicle, very important for trucks so that they don't drive on roads where they are not allowed to), compressed air sensors in the compressed air system in buses and trucks, altitude meter (usually used as a parameter for the engine control, but could also be used as an addition/correction to the altitude coordinate in a three dimensional positioning system), exhaust-gas sensor, exhaust gas recirculation triggering, soot sensor, NOX and Cox sensor, turbocharger triggering and intake and exhaust valve triggering, braking systems sensors, e.g. for ABS, EPS and PSS, door lock sensors, air bag sensors, rain sensors, gear shift sensors and transmission speed sensors, electronic battery sensors, tyre pressure sensor, fluid (gas, oil, cooling) level sensors.

Other areas to be mentioned besides above examples where a sensor data system 100 may be used are property management, home automation, real estate surveillance.

It should be understood that above applications and use examples for a sensor data system 100, and/or mentioned sensors are not limiting by any way to other application areas and is not limiting other types of sensors or sensor combinations.

It should be noted that FIG. 2 illustrates various functional units in the sensor data system 100 and relations to other systems, applications or devices that may interact with the sensor data system 100 and the skilled person is able to implement these functional units in practice using suitable software and hardware means. Thus, this aspect of the solution is generally not limited to the shown structures of the sensor data system 100, and the functional units 120, 130, 140,150 and 210, 220, 230, 240 may be configured to operate according to any of the features described in this disclosure, where appropriate.

The functional units 120, 130, 140,0150 and 210, 220, 230, 240 described above may be implemented in the sensor data system 100, by means of program modules of a respective computer program comprising code means which, when run by processor "P" 250 causes the sensor data system 100 to perform the above-described actions. The processor P 250 may comprise a single Central Processing Unit (CPU), or could comprise two or more processing units. For example, the processor P 250 may include general purpose microprocessors, instruction set processors and/or related chips sets and/or special purpose microprocessors such as Application Specific Integrated Circuits (ASICs). The processor P 250 may also comprise a storage for caching purposes.

Each computer program may be carried by a computer program product "M" 260 in the sensor data system 100, shown in FIG. 2, in the form of a memory having a computer readable medium and being connected to the processor P. Each computer program product M 260 or memory thus comprises a computer readable medium on which the computer program is stored e.g. in the form of computer program modules "m". For example, the memory M 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the sensor data system 100.

Figure 3:
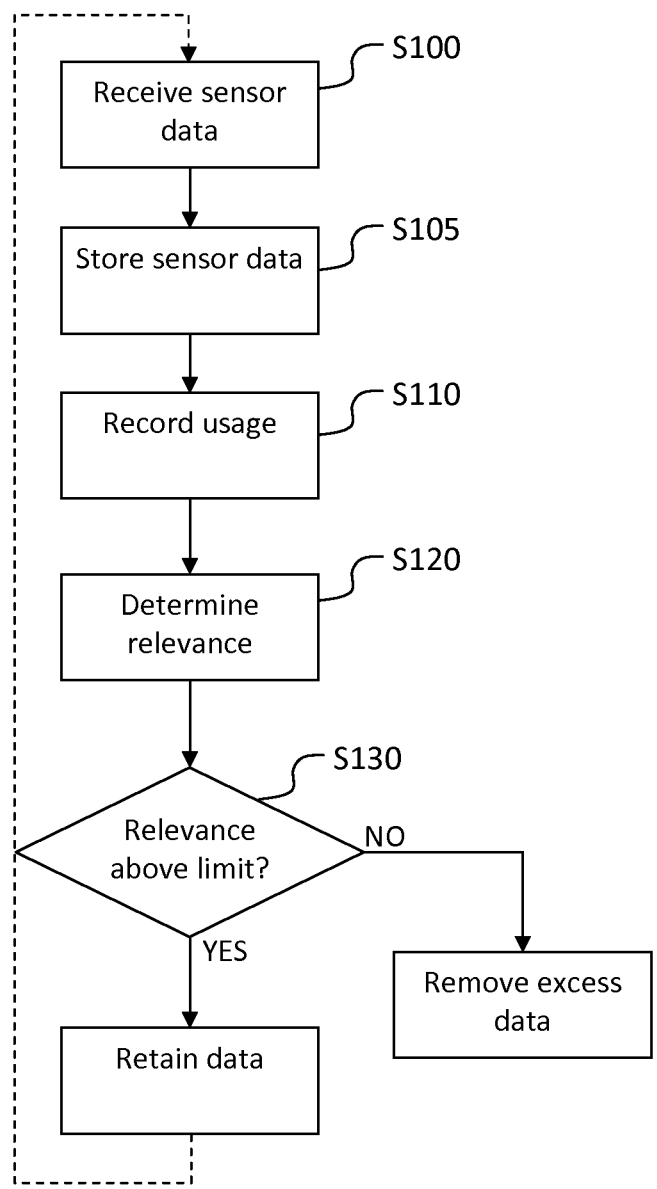
FIG. 3 is a flow chart illustrating a procedure in a sensor data system.

In FIGS. 2 and 3 the observations database 170 and the sensor device database 180 have been illustrated as not being a part of the sensor data system 100, but in another embodiment of the sensor data system 100, one of, or both the observations database 170 and the sensor device database 180 may be comprised in one or more memories of the sensor data system 100.

According to FIG. 2 a couple of additional sensor data systems 100 are shown. In a large system solution, a plurality of sensor data system 100 may serve with the same or similar functionality, as implemented in a single node. It may as well be the case that different sensor data systems 100 may contain different functionality and therefore carry out different functionalities, or partially different functionalities. How to architect and set up computers and communications networks for a solution is known to the person skilled in the art. It is therefore understood that there are a number of variants of how to set up a sensor data system 100, not limited by the above described examples.

A procedure in the sensor data system 100 will now be described with reference to FIG. 3. In a first step S100, sensor data is received from a sensor, i.e. an observation, and this is received by the reception unit and may be determined as relevant or non-relevant. If it is determined as non-relevant, it may be filtered away and potentially discarded. In a next step S105, at least some of the received sensor data is stored, by the storage unit 121. In a next step S110 usage of an observation is recorded by the recording unit. i.e. an observation received by a data user, is recorded. The data user is by example receiving an observation through publishing, or upon request. And the delivery of the observation to the data user may be noted as the usage. In step S120 the relevance of an observation is calculated. The relevance is calculated by the relevance calculation unit. The output from the relevance calculation unit is a calculated relevance of an observation, and is in step S130 basis for determination if the relevance is above a limit or below a limit. If the observation is determined as relevant, it is according to the figure retained, and if it is determined as below the limit it is considered excess data and should be removed.

Data users will use the observations and the sensor data system will iteratively remove excess data deemed less relevant from the observations database and thereby limit the size of the observations database to a desired size. It should be understood that the above described procedure may be applied to single observations, or applied to batches of observations. The above described sequence is an illustrative example, and the various steps may be done in different orders or performed in parallel.

Figure 4:
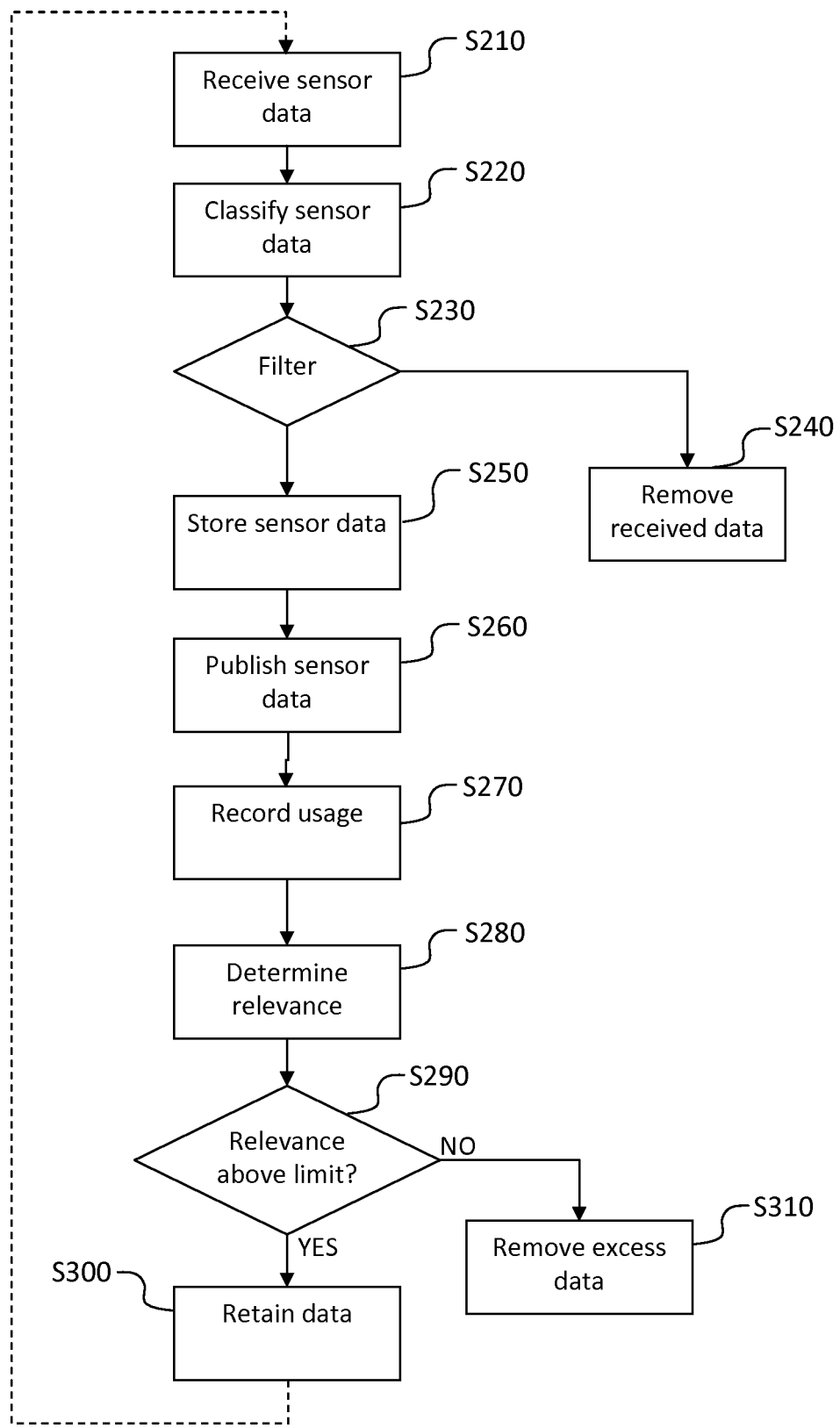
FIG. 4 is a flow chart illustrating a procedure in a sensor data system according to further possible embodiments.

FIG. 4 shows an embodiment of a procedure performed by the sensor data system 100. In a first step S210 data from a sensor is received, as an observation. The received observation is received by the reception unit shown in FIG. 2. This step may include identification of which kind of data that is received, e.g. a temperature, a position, a pH, etc, and from e.g. which specific sensor. In step S220 an observation may be classified as relevant or may be classified as non-relevant. Such classification may be determined by the system on the basis of a predetermined set up. Such classification may also be predetermined by the system based on previous calculations. An example may be that for a specific sensor every second observation should be classified as high, and the other every second observation should be classified low or redundant. The classification step S240 may perform classification of received observations, where the classification is performed on the basis of previous calculations performed by the relevance calculation unit shown in FIG. 2, or on the basis of a set up of the system.

In step S230 filtering is performed. In an embodiment is an observation classified as below a limit determined to be non-relevant, or may be classified as redundant. According to FIG. 4 such data will in step S240 be removed/deleted from the system, before storage in a database. An observation classified as above a limit, or classified relevant will pass through the filter to the next step S250. In step S250 is an observation stored in a database by storage unit 121. According to an embodiment, observations are typically stored in an observations database, as shown in FIG. 2.

In a next step S260 an observation is published. Such publication should be understood in a broad sense, and may include publication by the database to data users, or by retrieval of data users, or other normal procedures for conveying data from a database to a data user. At step S270 the usage is recorded, i.e an observation published to a data user. Such recording is typically carried out in the recording unit described in FIG. 2. A recorded usage may according to an embodiment be stored in a statistics storage database 270. In step S280 the relevance of an observation is determined. The determination may be calculated in the relevance calculation unit, described in FIG. 2 according to various procedures described above.

In step S290 it is decided if an observation is above a limit or not. If the observation is decided as relevant, it is retained in the database. If the observation is decided as non-relevant, the observation is in step S310 removed as excess data. According to FIG. 2, e.g. removed from the observations database.

Data users will use the observations and the sensor data system will iteratively remove excess data deemed less relevant from the observations database and thereby limit the size of the observations database. It should be understood that the above described procedure may be applied to single observations, or applied to batches of observations. The above described sequence is an illustrative example, and the various steps may be done in different orders of performed in parallel.

Figure 5:
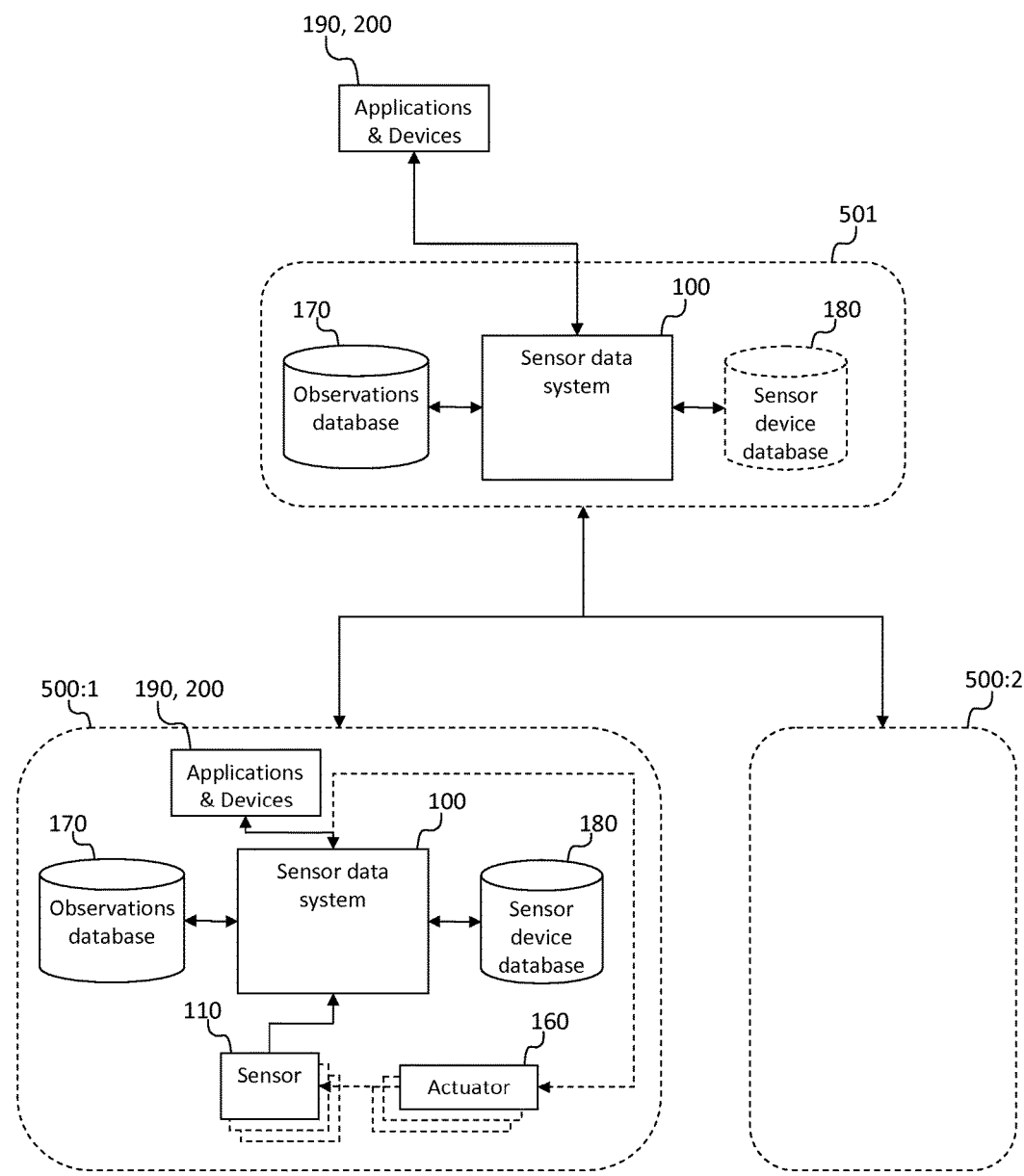
FIG. 5 is an illustrative embodiment of clustered sensor data system.

FIG. 5 shows an illustrative embodiment of a clustered sensor data system 100. A system may be implemented in various ways. It may be implemented on a single unit/host like a PC or an application server host or similar electronic device, or in a large scale environment with requirements on many transactions and redundancy. This is generally valid for most systems. For the clustered sensor data system 100, a clustered or hierarchical structure may however serve different purposes. According to FIG. 5 a first type of entity 500 may include the sensor data system 100, related sensors 110, actuators 160, observations database 170, sensor device database 180, applications 190 and devices 200. There may be a second entity 500:2 configured in a similar way as the first entity 500:1. In the same manner there may be a plurality of additional entities 500:n (not shown).

A clustered entity 501 is also shown in FIG. 5. The clustered entity 501 may not include all related, e.g. sensors 110 and actuators 160. Furthermore the sensor data system in the clustered entity 501 may perform its own relevance calculations and contain different observations than e.g. the first entity 500:1. The clustered entity 501 may for example consolidate observations from both the first and second entity 500:1, 500:2. The clustered entity 501 may in a network be located close to a backbone, whereas the entity 500:1 may be at a remote location with poor network connections, or even off line. In an embodiment different entities 500 of clustered entities 501 may serve different purposes and fulfill different needs.

While the solution has been described with reference to specific exemplary embodiments, the description is generally only intended to illustrate the inventive concept and should not be taken as limiting the scope of the solution. For example, the terms "observation", "monitor" and "sensor" have been used throughout this description, although any other corresponding nodes, functions, and/or parameters could also be used having the features and characteristics described here. The solution is defined by the appended claims.

The invention claimed is:

1. A sensor data system configured to handle sensor data, the sensor data system comprising:
a processor coupled to a memory that stores a computer program which, when executed by the processor, causes the sensor data system to:
receive the sensor data from a plurality of sensors,
filter the received sensor data, based on a predefined criteria, wherein, to filter the received sensor data, the processor executes the computer program to further cause the sensor data system to discard at least some of the received sensor data, and wherein, to discard the at least some of the received sensor data based on the predefined criteria, the processor executes the computer program to further cause the sensor data system to:
discard sensor data from a sensor of the plurality of sensors, wherein the sensor data, to be discarded, is received within a time interval after a previous received data from the sensor, and wherein the previous received data from the sensor is the latest stored data,
store undiscarded sensor data in an observations database,
record usage of the sensor data stored in the observations database, wherein, to record the usage of the stored sensor data, the processor executes the computer program to further cause the sensor data system to log a first stored sensor data that is used by a data user and a second stored sensor data that is unused by the data user,
determine relevance of the sensor data stored in the observations database based on the recorded usage, wherein the relevance of the sensor data stored in the observations database is determined based on information about sensors, of the plurality of sensors, that trigger the maximum number of actuators to be activated,
remove excess sensor data that have the determined relevance below a limit from the observations database, and retain relevant sensor data that have the determined relevance above the limit in the observations database, to limit a size of the sensor data stored in the observations database, and
control a plurality of actuators by using the retained relevant sensor data, wherein to control the plurality of actuators, the sensor data system activates at least one actuator of the plurality of actuators based on the retained relevant sensor data.

2. The sensor data system according to claim 1, wherein the processor executes the computer program to further cause the sensor data system to calculate uniqueness of the sensor data stored in the observations database.

3. The sensor data system according to claim 1, wherein the processor executes the computer program to further cause the sensor data system to calculate the usage of the sensor data stored in the observations database.

4. The sensor data system according to claim 1, wherein the processor executes the computer program to further cause the sensor data system to calculate influence of the sensor data stored in the observations database.

5. The sensor data system according to claim 1, wherein the processor executes the computer program to further cause the sensor data system to determine age of the sensor data stored in the observations database.

6. The sensor data system according to claim 1, wherein the processor executes the computer program to further cause the sensor data system to determine the relevance of the sensor data stored in the observations database based on parameters comprising a combination of at least two of: uniqueness, usage, influence, and age of the sensor data stored in the observations database.

7. The sensor data system according to claim 6, wherein the parameters for the determination of the relevance of the sensor data stored in the observations database are a static set or are dynamically adapted by the sensor data system.

8. The sensor data system according to claim 1, wherein the retained relevant sensor data is further used for reporting observations or the retained relevant sensor data is made available to the data user.

9. The sensor data system according to claim 1, wherein the processor executes the computer program to further cause the sensor data system to perform the determination of the relevance of the sensor data stored in the observations database periodically or when the observations database exceeds a certain size.

10. A method in a sensor data system for handling sensor data, the method comprising:
   receiving the sensor data from a plurality of sensors,
   filtering the received sensor data, based on a predefined criteria, wherein the filtering comprises discarding at least some of the received sensor data, and wherein the discarding the at least some of the received sensor data based on the predefined criteria comprises:
      discarding sensor data from a sensor of the plurality of sensors, wherein the sensor data, to be discarded, is received within a time interval after a previous received data from the sensor, and wherein the previous received data from the sensor is the latest stored data,
   storing undiscarded sensor data in an observations database,
   recording usage of the stored sensor data, wherein the recording the usage of the stored sensor data comprises logging a first stored sensor data that is used by a data user and a second stored sensor data that is unused by the data user,
   determining relevance of the stored sensor data based on the recorded usage, wherein the relevance of the stored sensor data is determined by calculating an influence of the stored sensor data, and wherein the influence of the stored sensor data is calculated by measuring relevance of each of the plurality of sensors,
   deciding to remove excess stored sensor data that have the determined relevance below a limit from the observations database, and to retain relevant stored sensor data that have the determined relevance above the limit in the observations database, to limit a size of the sensor data stored in the observations database, and
   controlling a plurality of actuators by using the retained relevant stored sensor data, wherein the controlling the plurality of actuators comprises activating at least one actuator of the plurality of actuators based on the retained relevant stored sensor data.

11. The method according to claim 10, wherein the relevance of the stored sensor data is further determined by calculation of uniqueness of the stored sensor data.

12. The method according to claim 10, wherein the relevance of the stored sensor data is further determined by calculation of the usage of the stored sensor data.

13. The method according to claim 10, wherein the relevance of the stored sensor data is further determined by calculation of age of the stored sensor data.

14. The method according to claim 10, wherein the relevance of the stored sensor data is further determined based on parameters comprising a combination of at least two of: uniqueness, usage, and age of the stored sensor data.

15. The method according to claim 14, wherein the parameters for the determination of the relevance of the sensor data stored in the observations database are a static set or are dynamically adapted.

16. The method according to claim 10, wherein the retained relevant sensor data is further used for reporting observations or the retained relevant sensor data is made available to the data user.

17. The method according to claim 10, wherein the determination of the relevance of the sensor data stored in the observations database is performed periodically or when the observations database exceeds a certain size.

18. A computer program, comprising computer readable code means, which when run by a processor in a sensor data system causes the sensor data system to perform the following steps:
   receiving sensor data from a plurality of sensors,
   filtering the received sensor data, based on a predefined criteria, wherein the filtering comprises discarding at least some of the received sensor data, and wherein the discarding the at least some of the received sensor data based on the predefined criteria comprises:
      discarding sensor data from a sensor of the plurality of sensors, wherein the sensor data, to be discarded, is received within a time interval after a previous received data from the sensor, and wherein the previous received data from the sensor is the latest stored data,
   storing undiscarded sensor data in an observations database,
   recording usage of the stored sensor data, wherein the recording the usage of the stored sensor data comprises logging a first stored sensor data that is used by a data user and a second stored sensor data that is unused by the data user,
   determining relevance of the stored sensor data based on the recorded usage,
   deciding to remove excess stored sensor data that have the determined relevance below a limit from the observations database, and to retain relevant stored sensor data that have the determined relevance above the limit in the observations database, to limit a size of the sensor data stored in the observations database, and
   controlling a plurality of actuators by using the retained relevant stored sensor data, wherein the controlling the plurality of actuators comprises activating at least one actuator of the plurality of actuators based on the retained relevant stored sensor data.

19. The computer program according to claim 18, wherein the relevance of the stored sensor data is determined by calculation of uniqueness of the stored sensor data.

20. The computer program according to claim 19, wherein the uniqueness of the stored sensor data is calculated based on similarity of one of the stored sensor data with another of the stored sensor data, and wherein the calculated uniqueness of the stored sensor data indicates that dissimilar stored sensor data are relevant sensor data.

21. The computer program according to claim 18, wherein the relevance of the stored sensor data is determined by calculation of the usage of the stored sensor data.

22. The computer program according to claim 18, wherein the relevance of the stored sensor data is determined by calculation of influence of the stored sensor data.

23. The computer program according to claim 18, wherein the relevance of the stored sensor data is determined by calculation of age of the stored sensor data.

24. The computer program according to claim 18, wherein the relevance of the stored sensor data is determined based on parameters comprising a combination of at least two of: uniqueness, usage, influence, and age of the stored sensor data.

25. The computer program according to claim 24, wherein the parameters for the determination of the relevance of the stored sensor data are a static set or are dynamically adapted.

26. The computer program according to claim 18, wherein the retained relevant sensor data is further used for reporting observations or the retained sensor data is made available to the data user.

27. The computer program according to claim 18, wherein the determination of the relevance of the stored sensor data is performed periodically or when the observations database exceeds a certain size.

28. A computer program product, comprising a non-transitory computer readable medium and the computer program according to claim 18, wherein the computer program is stored on the non-transitory computer readable medium.

* * * * *